Aug. 12, 1969    MASAHIRO HAYASHI    3,460,423

SHEARING MACHINE

Filed Dec. 22, 1966    2 Sheets-Sheet 1

United States Patent Office 3,460,423
Patented Aug. 12, 1969

3,460,423
SHEARING MACHINE
Masahiro Hayashi, Hitachi-shi, and Shinkichi Goto, Kitakyushu-shi, Japan, assignors to Yawata Iron & Steel Co., Ltd., and Hitachi Limited, both of Tokyo, Japan
Filed Dec. 22, 1966, Ser. No. 603,867
Claims priority, application Japan, Dec. 22, 1965, 40/78,560
Int. Cl. B26d 5/42, 5/08
U.S. Cl. 83—390          12 Claims

ABSTRACT OF THE DISCLOSURE

The present disclosure relates to a shearing apparatus having a main housing unit and a cutter unit mounted for easy removal within the main housing unit. The main housing unit contains power means for driving the cutter and releasable means for locking the cutter unit with respect to the main housing. When it is desirable to change cutters, for example, the cutter unit is released and removed from the main housing unit and replaced with another cutter unit. The power units and the like for the cutter unit are engaged and disengaged when the cutter unit is assembled and disassembled, respectively, with respect to the main housing unit. Preferably, the movable cutter reciprocates and carries a work clamp, and the main housing unit carries the releasable means.

Background of the invention

In the prior art, it has been extremely difficult and time-consuming to change cutters in shearing apparatus, particularly reciprocating cutters when it is necessary to use a different blade element having specific advantageous characteristics relating to a new type of material to be sheared. It is quite often necessary to provide a specifically shaped cutter to fit the cross-sectional shape of the material to be sheared. Therefore, it is usually desirable and sometimes necessary to change the cutter in a shearing apparatus each time a material having a different cross-sectional shape is to be sheared. It is highly desirable that the cutter changing time be as short as possible, because the machine and production must be stopped during cutter changing operations. However, prior art shearing machines employ cutters that are mounted by bolts, nuts, and the like, which are difficult and time-consuming to unlock by means of impact wrenches, or the like tools.

Brief description of the invention

It is an object of the present invention to provide a shearing apparatus that is more simple and has an easily removable and replaceable cutter unit, particularly a reciprocating cutter. Although broad aspects of the present invention may be used in rotary cutters, for example, the more specific aspects of the present invention are particularly advantageously suited for use with a reciprocating cutter. Specifically, the cutter unit of the present invention includes a reciprocating movable cutter mounted for movement relative to a stationary cutter, and a work clamp mounted on and mounted for movement with respect to the movable cutter. The power means for driving the movable cutter and the releasable means for locking the removable cutter unit into the main housing unit are a part of the main housing unit. Guide means are provided for supporting and guiding the movement of the removable cutter unit between an assembled position within the main housing unit and a disassembled position completely removed from the main housing unit; transfer means are employed to store a second cutter unit, remove the first cutter unit from the main housing, store the first cutter unit, and assemble the second cutter unit into the main housing unit. Coupling means are provided on the main housing unit and the cutter unit for drivingly engaging the movable cutter and its power means automatically by assembly of the cutter unit and for automatically disengaging the movable cutter unit and power means by relative movement during disassembly.

Further objects, features, advantages and modifications of the present invention will become more apparent from the following detailed description of preferred embodiments of the present invention in relation to the accompanying drawing.

Brief description of the drawing

The same numerals are used commonly throughout the drawing to illustrate the same structure.

Detailed description

Figure 1:
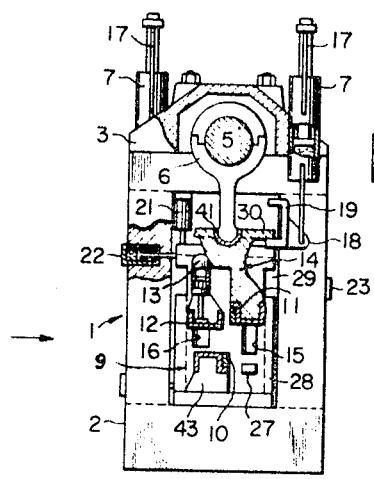
FIGURE 1 is a partial cross-sectional front elevation view of a preferred embodiment of the present invention in its standby condition of use.

The shearing apparatus 1 according to FIGURE 1–5 includes a main housing unit 2 having a housing 3 supporting a crankshaft 4 that is rotatably driven by a suitable electric motor, or the like (not shown). A connecting rod 6 is rotatably mounted on a crank portion 5 of the crankshaft 4 to produce a reciprocating motion. A plurality of fluid operated balancing pressure cylinders 7 and their cooperating linkages are provided to hold the movable cutter of the cutter unit into driving engagement with the lower end of the connecting rod 6, as more fully explained below, to constitute the elements associated with the cylinder 7, the crankshaft 4, crank portion 5 and connecting rod 6, the main housing unit power means for driving the cutter unit.

A cutter unit 9 is removably locked within the main housing unit 2. This cutter unit 9 is completely separate and an operative cutter unit, except for power means to be supplied by the main housing unit. A bottom relatively stationary cutter support 43 carries the stationary cutter element 10 and provides a work supporting and clamping surface. The housing of the cutter unit is provided with two parallel vertically extending slots or guiding grooves 15, 16 on each of the mutually facing side walls 44 for supporting the movable cutter support 14 and the material or work clamp 12, respectively. A movable cutter 11 is mounted in the support 14 for vertical reciprocation guided by the grooves 15 operatively toward and away from the relatively stationary cutter 10. A fluid operated power cylinder 13 is mounted on the movable cutter support 14 for reciprocating the work clamp 12 operatively toward and away from the cooperating work clamping top surface of the support 43; the work clamp being vertically guided within the grooves 16. Basically, the work clamp and cutters will operate in the conventional cutting sequence to clamp and shear a workpiece. A suitable source of fluid pressure is provided for the cylinder 13, which may be automatically connected when the cutter unit 9 is installed in the main housing unit 2 or it may be manually connected after assembly.

Figure 4:
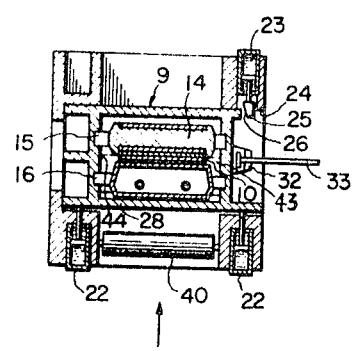
FIGURE 4 is a cross-sectional view taken through the lower portions of the movable cutter element and the work clamp of FIGURES 1 and 2.

The cutter unit 9 is releasably mounted within a chamber 8 of the main housing unit 2 by releasable means comprising a plurality of fluid pressure operated power cylinders 21, 22 and 23. The chamber 8 has an open end 24 for removal and assembly of the cutter unit 9. These power cylinders 21, 22 and 23 operate relatively movable jaw clamp means for relative jaw clamping movement in three mutually perpendicular directions to provide a three dimensional clamp. As shown in FIGURE 4, the power cylinder 23 is mounted within one side wall of the main housing unit for operatively projecting and retracting a piston rod unit 25 having a tapered cam face 26, which will wedge against the adjacent portion of the cutter unit 9 to provide a horizontal front-to-rear clamping force. The power cylinders 22 carry clamping piston rods for engaging a side of the cutter unit 9 as shown in FIGURE 4, to provide a side to side clamping force in the horizontal plane. As shown in FIGURE 1, the upper power cylinder 21 is provided with a clamping piston rod for engaging the top surface of the unit 9 to provide a vertical clamping force.

Figure 5:
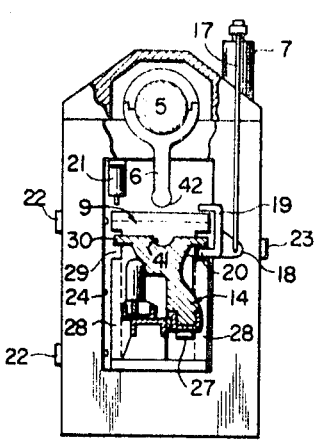
FIGURE 5 is a view similar to FIGURE 1 showing the shearing apparatus in its cutter changing position.

When the cutter unit 9 has been first installed in the main housing unit 2 or is ready for disassembly therefrom, the movable cutter support 14 rests against a stop 27 provided for this purpose, as shown in FIGURE 5. The balancing power cylinders 7 have vertically reciprocating piston rods that carry hanger members 17 for vertically reciprocating coupling elements (one being shown) 18 having an inwardly opening U-shaped portion providing a coupling groove. In the lower position of the coupling element 18, as determined by a suitable controlled fluid pressure source for the power cylinders 7, the groove of the U-shaped member 19 is in an aligned position to receive a coupling tongue portion 20 on the movable cutter support 14 when the cutter unit 9 is assembled with the main housing unit 2 to establish a driving connection between the coupling element 18 and the movable cutter support 14, as shown in FIGURE 5. A recessed portion 29 is provided in the side wall 28 of the cutter unit 9 to provide clearance for the U-shaped coupling member 19 during assembly and disassembly of the cutter unit 9 with respect to the chamber 8 of the main housing unit 2, with the cutter unit 9 moving to the right through the window 24 as viewed in FIGURES 2 and 4.

After the cutter unit 9 has been assembled in the chamber 8 as shown in FIGURE 5, the releasable means, including the power cylinders 21, 22 and 23 are actuated to rigidly mount the cutter unit 9 within the main housing unit 2. Next, the balancing cylinders 7 are actuated to lift the movable cutter support 14 by means of the tongue and groove coupling connection 20, 19 until the recessed bearing portion 41 of the support 14 engages the bearing end 42 of the connecting rod or link 6 for biasing the movable cutter into engagement with the connecting rod 6 to establish a driving connection. The balancing cylinders 7 will yield to allow the movable cutter support 14 to move downwardly under the influence of the reciprocating connecting rod 6; the biasing force of the balancing cylinders 7 may be suitably adjusted for this purpose.

During operation of the shearing apparatus the material to be sheared is conveyed to the shearing apparatus 1 by means of a roller 40, FIGURE 4, that is mounted within the housing 3. Thereafter, the work clamp 12 is reciprocated to clamp the material against the work surface of the support 43. The material is then sheared by the relative movement between the movable cutter element 11 and the stationary cutter element 10 as the crankshaft 4 is rotated.

Figure 2:
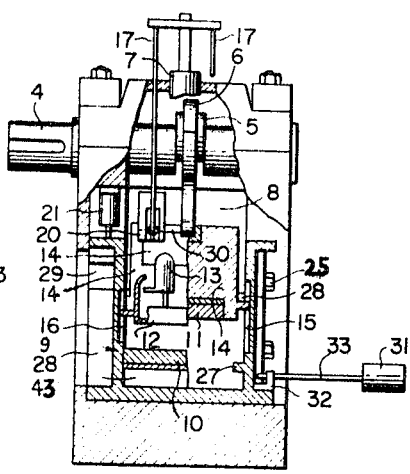
FIGURE 2 is a partial cross-sectional side elevation view of the embodiment of FIGURE 1.
Figure 3:
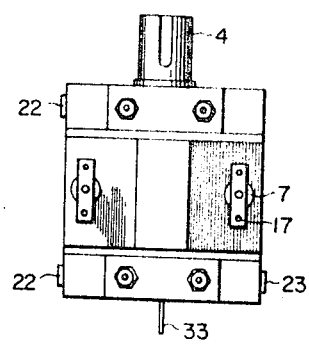
FIGURE 3 is a plan view of the top portion of the embodiment according to FIGURE 1.
Figure 6:
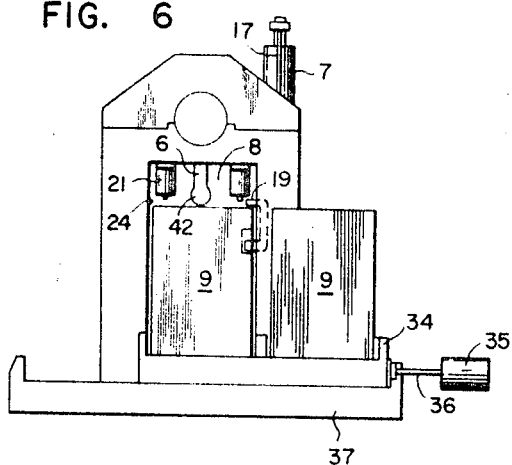
FIGURE 6 is a somewhat schematic illustration of the shearing apparatus with a plurality of cutter units, guide means and transfer means for interchanging and storing the cutter units.

When it is required to change cutters, for example, when material having a different cross-sectional shape requiring a differently shaped cutter is to be sheared, the shearing apparatus is returned to its condition as shown in FIGURE 5, with the clamping portions of the power cylinders 21, 22 and 23 retracted to release the cutter unit 9. Guide means, shown in the drawing as simple plane bearing surfaces on the bottom of the cutter unit 9 and plane cooperating supporting surfaces of the housing unit 2, are provided for supporting and guiding the cutter unit 9 for movement between an assembled position (FIGURES 1–5) and a disassembled position completely removed from the main housing unit 2. It is contemplated that this guide means may take the form of rollers and tracks or other suitable friction reducing constructions. As shown in FIGURES 2, 4 and 6, transfer means are provided for storing an additional cutter unit 9, removing the previously assembled cutter 9 from the main housing 2, storing the thus removed cutter unit 9, and assembling the additional cutter unit 9 into chamber 8 of the main housing unit 2. As shown most clearly in FIGURE 6, a carriage 34 is mounted for movement from side to side on a support 37 and is driven between these positions by a relatively stationary power cylinder 34 and a cooperating piston rod or link 36. Two storage channels are shown on the movable carriage 34, but it is contemplated that any number of storage channels may be provided according to the desired number of different types of cutter units 9 that may be employed with the shearing apparatus 1. The cylinder 34 is actuated to bring an empty storage channel in alignment with the chamber 8; the bottom supporting surfaces of the chamber 8 and storage channels being aligned to partially form the above-mentioned guide means. Thereafter, a stationarily mounted cylinder 31, FIGURE 2, is actuated to withdraw its piston rod 33, which has a tongue portion in engagement with a groove portion 32 on the cutter unit 9 that is within the chamber 8, to move the cutter unit 9 within the chamber 8 through the window 24 and into the previously empty storage channel, as shown in FIGURE 6. Thereafter, the power cylinder 35 is actuated to move the movable carriage 34 to the left, as shown in FIGURE 6, to align the right or additional cutter unit 9 with the chamber 8; during this movement of the movable carriage, the tongue portion of the piston rod 33 disengages from the first cutter unit 9 and establishes engagement with the second or right hand additional cutter unit 9 of FIGURE 6. Next, the power cylinder 31 is actuated to extend its piston rod 33 and drive the additional cutter unit into assembly within the chamber 8 of the main housing unit 2. Thereafter, the power cylinders 21, 22, 23 and 7 are actuated to establish the working condition shown in FIGURE 1 with the now assembled additional cutter unit 9. The above mentioned operation may be performed automatically in the proper sequence with solenoid controlled valves for controlling the actuation of the various power cylinders and a pattern control for controlling the sequential actuation of the solenoids, for example.

Figure 7:
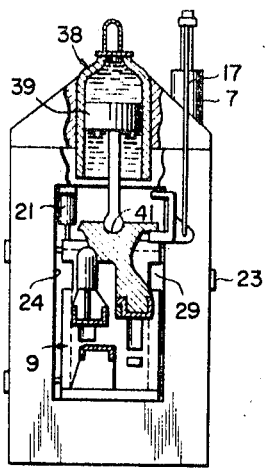
FIGURE 7 is a partial cross-sectional front elevation view of another embodiment of the present invention employing different power means for the reciprocating cutter.

According to the broad aspects of the present disclosure, various modifications are contemplated, for example, the power cylinder 13 may be mounted on the housing of the cutter unit 9 or may be mounted as a unit together with the material holder 12 as a rigid part of the main housing unit 2. However, it is preferable to provide the material holder as close as possible to the movable cutter. Furthermore, the movable cutter power means may be fluid actuated as shown in FIGURE 7 wherein like reference numerals are used to indicate elements identical with those previously described above in regard to the embodiment of FIGURES 1–6; a fluid pressure cylinder 38, preferably hydraulic, is provided with a piston 39 for vertically reciprocating a piston rod engaging the bearing recess 41 of the movable cutter support 14 to vertically reciprocate the movable cutter with respect to the stationary cutter.

According to the present invention, the cutter changing operaion may be completed easily and quickly, while involving only a few steps that may be fully automated. Even without full automation, the various physical connections and lubrication of the cutter unit may be accomplished very quickly, when compared with the prior art. In actual practice with a shearing apparatus embodying the broader aspects of the present invention that was not fully automated, the time required for changing the cutter unit was only about 10 minutes; on the other hand, a prior art shearing apparatus of comparable size and output would require between one and two hours to accomplish a changing of its cutter. In view of the high cost of such machines and maintaining a plant in operating condition, such a saving of time is extremely valuable and advantageous.

The above embodiments and variations have been described only for purposes of illustrating preferred embodiments of the present invention and it is contemplated that additional embodiments, variations and modifications will fall within the spirit and scope of the present invention as defined by the following claims.

We claim:

1. A shearing apparatus comprising: a cutter unit having at least one relatively stationary cutter and at least one cooperating movable cutter mounted for reciprocation relative to said stationary cutter; a relatively stationary main housing unit; releasable means for rigidly mounting said cutter unit to said main housing unit; power means provided with said main housing unit for reciprocating said movable cutter relative to said stationary cutter and including a power connecting link having a coupling end and means to generally reciprocate said link; coupling means for drivingly engaging said movable cutter and said power means, and including a bearing surface on the coupling end of said link and a corresponding abutment bearing surface on said movable cutter, said coupling means further including a coupling element mounted for reciprocation on said main housing unit; fluid operated means mounted on said main housing unit for biasing said element away from said movable cutter toward said link; and tongue and groove means interengaging said movable cutter and said coupling element automatically by assembly of said cutter unit in said main housing unit and for automatically disengaging said coupling element and said movable cutter by relative movement of said main housing and said cutter unit during disassembly.

2. The device of claim 1, including guide means for supporting and guiding said cutter unit for movement between an assembled position within said main housing unit and a disassembled position completely removed from said main housing unit.

3. The device of claim 2, wherein said cutter unit includes a working clamp mounted for reciprocation on said movable cutter and fluid power cylinder means mounted on said movable cutter for reciprocating said work clamp relative to said mountable cutter.

4. The device of claim 3, wherein said releasable means includes three separate fluid operated relatively movable jaw clamp means on said main housing unit for relative jaw clamping movement in three mutually perpendicular directions, respectively.

5. The device of claim 4, wherein said housing unit includes said releasable means.

6. The device of claim 5, including a second cutter unit of substantially identical external configuration as said first mentioned cutter unit; said second cutter unit having at least one relatively stationary cutter and at least one cooperating movable cutter mounted for movement relative to said stationary second cutter, and transfer means for storing said second cutter unit, removing said first mentioned cutter unit from said main housing, thereafter storing said first mentioned cutter unit and assembling said second cutter unit into said main housing unit.

7. The device of claim 1, wherein said cutter unit includes a working clamp mounted for reciprocation on said movable cutter and fluid power cylinder means mounted on said movable cutter for reciprocating said work clamp relative to said movable cutter.

8. The device of claim 1, wherein said housing unit includes said releasable means.

9. The device of claim 1, including a second cutter unit of substantially identical external configuration as said first mentioned cutter unit; said second cutter unit having at least one relatively stationary cutter and at least one cooperating movable cutter mounted for movement relative to said stationary second cutter, and transfer means for storing said second cutter unit, removing said first mentioned cutter unit from said main housing, thereafter storing said first mentioned cutter unit and assembling said second cutter unit into said main housing unit.

10. A shearing apparatus, comprising: a cutter unit having at least one relatively stationary cutter and at least one cooperating movable cutter mounted for movement relative to said stationary cutter; a relatively stationary main housing unit; releasable means for rigidly mounting said cutter unit to said main housing unit; and said main housing unit having power means for driving said movable cutter relative to said stationary cutter; said releasable means including three separate fluid operated relatively movable jaw clamp means on said main housing unit for relative jaw clamping movement in three mutually perpendicular directions, respectively.

11. The device of claim 10, including coupling means on said movable cutter and on said power means for drivingly engaging said movable cutter and said power means automatically by assembly of said cutter unit in said main housing unit, and automatically disengaging said movable cutter and said power means by relative movement of said main housing and said cutter unit during disassembly.

12. The device of claim 10, wherein said movable cutter is mounted for only reciprocation relative to said stationary cutter; and said power means reciprocates said movable cutter relative to said stationary cutter.

References Cited

UNITED STATES PATENTS

| | | | |
|---|---|---|---|
| 3,054,317 | 9/1962 | Castle | 83—639 X |
| 3,077,134 | 2/1963 | Ronick | 83—563 X |
| 3,081,660 | 3/1963 | Parrish et al. | 83—563 |
| 3,188,899 | 6/1965 | Cederleaf | 83—698 X |
| 3,225,686 | 12/1965 | Clements | 83—563 X |

FOREIGN PATENTS

| | | |
|---|---|---|
| 16,544 | 1893 | Great Britain. |

JAMES M. MEISTER, Primary Examiner

U.S. Cl. X.R.

83—461, 549, 560, 563, 698